United States Patent [19]

Watanabe

[11] 4,396,269
[45] Aug. 2, 1983

[54] SHUTTER RELEASE LOCKING DEVICE
[75] Inventor: Sakuji Watanabe, Warabi, Japan
[73] Assignee: Nippon Kogaku K.K., Tokyo, Japan
[21] Appl. No.: 256,305
[22] Filed: Apr. 22, 1981
[30] Foreign Application Priority Data May 9, 1980 [JP] Japan .................................. 55/60691

[51] Int. Cl.³ .............................................. G03B 9/08
[52] U.S. Cl. ..................................... 354/235; 354/268
[58] Field of Search ...................... 354/60 R, 235, 268
[56] References Cited

U.S. PATENT DOCUMENTS

| | | | |
|---|---|---|---|
| 4,112,446 | 9/1978 | Numata et al. | 354/268 |
| 4,190,344 | 2/1980 | Ishiguro et al. | 354/268 |
| 4,236,802 | 12/1980 | Uchidoi et al. | 354/268 |
| 4,258,999 | 3/1981 | Tominaga | 354/268 |
| 4,269,489 | 5/1981 | Takimoto | 354/268 |
| 4,275,955 | 6/1981 | Kitai et al. | 354/268 |
| 4,310,230 | 1/1982 | Motoori | 354/268 |

Primary Examiner—Russell E. Adams
Attorney, Agent, or Firm—Fitzpatrick, Cella, Harper & Scinto

[57] ABSTRACT

A camera comprises an automatic exposure control device having a comparing circuit adapted for comparing a time output signal indicating the time from the shutter aperture opening function with a proper output signal indicating an appropriate exposure time and for releasing a comparison signal when a determined relationship is reached between said output signals, and solenoid means adapted for blocking the shutter aperture closing function when energized and being deactivated in response to the comparison signal to cancel the blocking; and a shutter release locking device having a voltage detecting circuit adapted for deactivating the solenoid means prior to the shutter aperture opening function when the power supply voltage becomes lower than a determined limit level, and blocking means for prohibiting the shutter aperture opening function in response to the deactivation of the solenoid means prior to the shutter aperture opening function.

The shutter release locking device comprises a limiter circuit for supplying a signal of a determined level instead of the proper output signal to the comparing circuit thereby enabling to obtain the comparison signal therefrom in case the proper output signal exceed a determined level.

4 Claims, 1 Drawing Figure

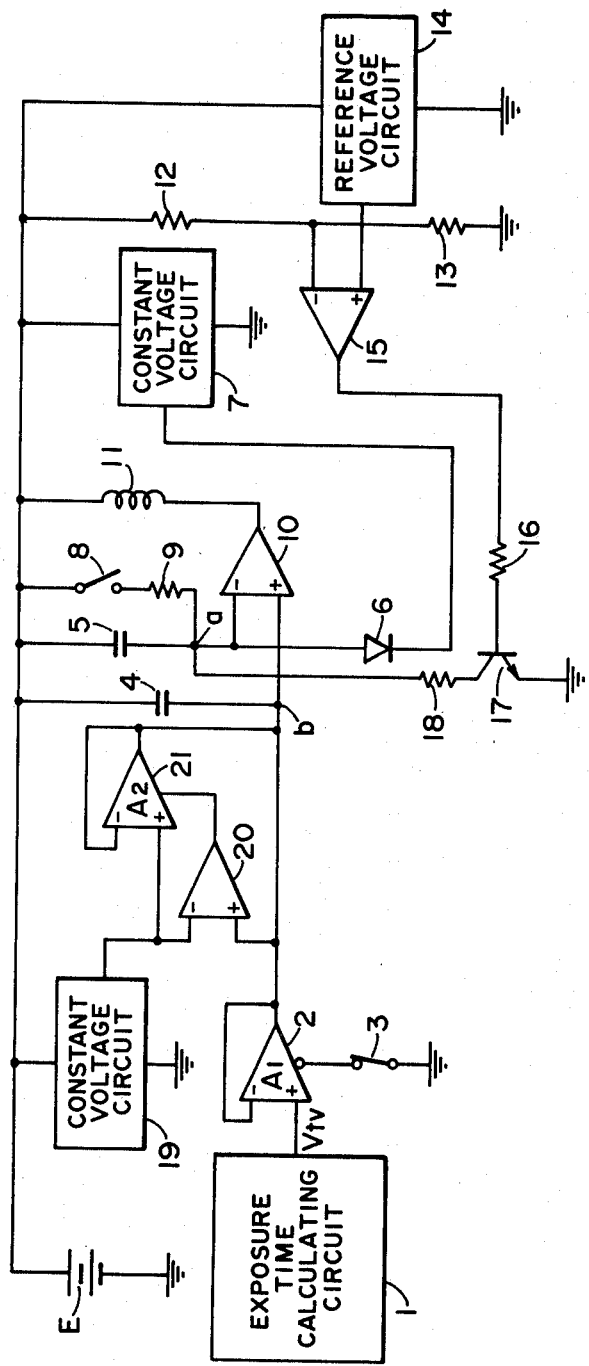

SHUTTER RELEASE LOCKING DEVICE

BACKGROUND OF THE INVENTION

1. Field of the Invention

The present invention relates to a device for automatically locking the release of an electric shutter in case the power supply voltage becomes lower than a limit level.

2. Description of the Prior Art

In an electric shutter, a time output signal indicating the time from the opening of the shutter aperture is compared with a shutter speed output signal indicating an appropriate exposure time calculated from the luminance of the object, lens aperture and film sensitivity, and a solenoid for blocking the shutter closing movement is deactivated to close said shutter aperture when a determined relationship is reached between said two output signals, but such exposure time control function cannot be conducted properly if the power supply voltage becomes lower than a determined limit level. For this reason there is already known a shutter release locking device which prohibits the opening function of the shutter aperture in case the power supply voltage becomes lower than the determined limit level. Such shutter release locking device is provided with a voltage detecting circuit adapted for detecting the power supply voltage and deactivating the solenoid for blocking a shutter aperture closing member prior to the opening movement of shutter aperture in case thus detected power supply voltage is lower than the determined limit level, and blocking means for blocking a shutter aperture opening member in response to said solenoid deactivation prior to the shutter aperture opening function. However, in case the luminance of the object is so high that the appropriate exposure time is far shorter than the minimum exposure time achievable with the electric shutter, the aforementioned determined relationship is reached between the shutter speed output signal for said appropriate exposure time and the time output signal even before the opening function of the shutter aperture, so that said solenoid is deactivated before the shutter aperture can be opened independently from said voltage detecting circuit, thereby activating the blocking means to disable the shutter release. Such shutter release locking under certain exposure condition despite of a sufficiently high power supply voltage is undesirable because such situation may be mistaken by the camera operator as a lowered power supply voltage.

SUMMARY OF THE INVENTION

The object of the present invention is to provide a shutter release locking device adapted for locking the shutter release only when the power supply voltage becomes lower than a determined limit level and not in other instances.

The foregoing object is achieved according to the present invention by clamping, in case the appropriate shutter speed output signal calculated from exposure factors such as film sensitivity, lens aperture, luminance of the object etc. exceeds a determined level corresponding to the fastest shutter speed controllable by the electric shutter, said appropriate shutter speed output signal at a determined level.

BRIEF DESCRIPTION OF THE DRAWING

The attached drawing is a circuit diagram of a shutter release locking device embodying the present invention.

DETAILED DESCRIPTION OF THE PREFERRED EMBODIMENTS

The shutter release locking device of the present invention will now be clarified in detail by an embodiment shown in the attached drawing.

An exposure time calculating circuit 1 calculates the appropriate shutter speed based on the information of the object luminance from an unrepresented photoreceptor for receiving the light passing through a picture-taking lens and the information from an unrepresented exposure factor introducing circuit for introducing the exposure factors such as lens aperture and film sensitivity, and releases a corresponding signal voltage Vtv, which is charged in a memory condenser 4 through an analog switch 2. A memory switch 3, normally closed to maintain the analog switch 2 conductive, is opened immediately before the photoreceptor is shielded from the incident light at the shutter release function to render the analog switch 2 non-conductive, whereby the signal voltage Vtv of the exposure time calculating circuit 1 is memorized in said memory condenser 4.

A timer circuit is composed of a timer condenser 5, a diode 6, a constant voltage circuit 7, a current control resistor 9 and a trigger switch 8. Said trigger switch, normally closed to short circuit the condenser 5, is opened at the shutter release to initiate the charging of the timer condenser 5 by the constant voltage circuit 7 through the diode 6. In the normal function, the potential at a junction a is higher than that at a junction b immediately after the trigger switch 8 is closed, whereby a comparator 10 releases a low-level output signal to energize a solenoid 11 for blocking a shutter closing member.

When said potential at the junction a, or the charged voltage of the condenser 5, representing the time from the shutter aperture opening by a shutter opening member of from the opening of the trigger switch 8 reaches a determined relationship with or becomes equal to the signal voltage Vtv at the junction b, the comparator 10 releases a high-level output signal to deactivate the solenoid 11, thus causing the function of the shutter closing member. In this manner the shutter aperture is closed at the appropriate shutter speed to automatically obtain an appropriate exposure.

A voltage detecting circuit is composed of voltage-dividing resistors 12, 13, a reference voltage generator 14, a comparator 15, a resistor 16, a transistor 17 and a resistor 18. The comparator 15 compares the power supply voltage divided by the resistors 12, 13 with a reference voltage supplied by said reference voltage generator 14, and releases a high-level output signal when said divided voltage becomes lower than said reference voltage to turn on the transistor 17 thereby forcedly and sufficiently reducing the potential at the junction a. In this manner, when the power supply voltage becomes lower than a determined limit level required for normal function of the circuit, the junction a is forcedly brought to a low-level potential to obtain a high-level output signal from the comparator 10 thereby deactivating the solenoid 11 regardless of the signal voltage Vtv and of the charged voltage in the timer condenser 5.

A limiter circuit is composed of a constant voltage circuit 19, a comparator 20 and an analog switch 21, wherein said comparator 20 compares the constant voltage supplied from said constant voltage circuit 19 with the signal voltage Vtv and releases, when the latter is larger than the former, a high-level output signal, in response to which the analog switch 21 is rendered conductive to supply the constant voltage from the constant voltage circuit 19 to the junction b. The output impedance of said analog switch 21 is selected much smaller than that of the analog switch 2, so that the comparator 10 received the constant voltage from said constant voltage circuit 19 instead of the signal voltage Vtv in case it becomes higher than said constant voltage. Stated differently, the calculated shutter speed, if faster than the achievable fastest shutter speed, is limited to such fastest shutter speed by means of said limiter circuit. The constant voltage of said constant voltage circuit 19 is selected in such a manner that the comparator 10 releases a low-level output signal to energize the solenoid 11 upon receipt of said constant voltage at an input terminal and upon receipt at the other of the potential at the junction a when the trigger switch 8 is closed. More specifically the constant voltage of said circuit 19 is selected slightly lower than the potential at the junction a in the closed state of the trigger switch 8. In this manner the solenoid 11 is always energized to enable the function of the shutter opening member even when the appropriate shutter speed calculated from the exposure factors exceeds the fastest controllable shutter speed.

Now there will be explained the function of the foregoing circuit in various function modes.

(1) When the power supply voltage is lower than the limit level:

When the divided voltage obtained from the resistors 12, 13 is lower than the reference voltage of the reference voltage circuit 14, the voltage detecting circuit detects such insufficient voltage level of the power supply prior to the opening of shutter aperture, whereby the comparator 15 releases a high-level output signal to turn on the transistor 17, thereby bringing the junction a to an extremely low level potential. Consequently the comparator 10 releases a high-level output signal regardless of the signal voltage Vtv to deactivate the solenoid 11, prior to the opening of shutter aperture, in response to which the unrepresented blocking means prohibits the function of the shutter opening member, thus locking the shutter release.

(2) When the power supply voltage is equal to or higher than the limit level:

(a) A normal electric shutter function is performed in case the appropriate shutter speed calculated from the luminance of the object to be photographed and from other selected exposure factors is lower than the fastest shutter speed achievable by the electric shutter and the signal voltage Vtv is lower than the potential at the junction a in the closed state of the trigger switch 8. In such state, upon opening of the memory switch 3 at the shutter release, the analog switch 2 is rendered non-conductive to store the signal voltage Vtv in the memory condenser 4. Said stored signal voltage, being lower than the potential at the junction a in the closed state of the trigger switch 8 as explained above, causes the comparator 10 to energize the solenoid 11, thereby blocking the shutter closing member. Thereafter the trigger switch 8 is opened upon opening of shutter aperture by the shutter opening member to initiate the charging of the timer condenser 5, whereby the output voltage at the junction a becomes lower with the lapse of time after said opening of shutter aperture. When said output voltage of the condenser 5 reaches a determined relationship with, for example becoming smaller than, the memorized signal voltage Vtv, the comparator 10 releases a high-level output signal to deactivate the solenoid 11, thereby causing the shutter aperture closing operation by the shutter closing member. In this manner achieved is an exposure control with an appropriate shutter speed.

(b) In case the appropriate shutter speed calculated by the exposure time calculating circuit 1 is much higher, due for example to an extremely high luminance of the object, than the fastest shutter speed achievable with the electric shutter so that the signal voltage Vtv is already higher than the potential at the junction a at the closed state of the trigger switch 8, such signal voltage causes the comparator 10 to deactivate the solenoid 11 regardless of the state of said trigger switch 8, thus resulting in the locked shutter release. In order to prevent such phenomenon there is provided the limiter circuit, wherein the comparator 20 compares the signal voltage Vtv in such state with the output voltage of the constant voltage circuit 19 selected slightly lower than the potential of the junction a in the closed state of said trigger switch 8 and releases a high-level output signal when the former is larger than the latter to render the analog switch 21 conductive. In this manner the junction b is clamped at the output voltage of said constant voltage circuit 19 as explained in the foregoing. Consequently the comparator 10 received, instead of the signal voltage Vtv, the output voltage of said analog switch 21 supplied from the constant voltage circuit 19. Since said output voltage is lower than the potential at the junction a in the closed state of the trigger switch 8, the comparator 10 releases a low-level output signal to energize the solenoid 11. In this manner the electric shutter can be always released as long as the power supply voltage is sufficiently high, even when the appropriate shutter speed is faster than the fastest shutter speed achieved with the electric shutter.

I claim:

1. In a camera comprising means for generating a first signal of a level corresponding to an apprpropriate exposure time;
    means for generating a second signal in synchronization with initiation of exposure effected by a shutter, the level of said second signal changing from a predetermined level in response to elapse of time;
    means for generating a third signal when the level of said first signal and the level of said second signal reach a predetermined relationship;
    means for completing exposure in response to said third signal, the exposure completing means locking the shutter when said third signal is generated prior to the initiation of the exposure; and
    means for locking said shutter when power supply voltage becomes lower than a determined limit level, the improvement comprising:
    the first signal generating means including means for detecting the level of said first signal prior to the initiation of the exposure, and means for limiting the level of said first signal to a predetermined value which prevents an initial completion of said determined relationship when the detected first signal exceeds a value which would cause an initial generation of said third signal.

2. A camera according to claim 1, wherein said locking means includes means for changing the relative level of said first signal and said second signal in order to complete said determined relationship between the level of said first signal and the level of said second signal when the power supply voltage becomes lower than said determined limit level.

3. A camera according to claim 1, wherein said limiting means limits the level of said first signal to a level corresponding to the minimum exposure time which is controllable by said shutter.

4. A camera according to claim 1, wherein said limiting means include means for generating a fourth signal having said predetermined level, means for comparing said first signal and said fourth signal, and means for supplying selectively said first signal and said fourth signal to said third signal generating means in response to said comparing means.

* * * * *